United States Patent [19]

Card et al.

[11] Patent Number: 5,576,698
[45] Date of Patent: Nov. 19, 1996

[54] PHYSICAL ADDRESSING OF MODULES

[75] Inventors: Daniel C. Card; Kevin A. Dickson, both of Winnipeg, Canada

[73] Assignee: Unisys Corporation, Blue Bell, Pa.

[21] Appl. No.: 311,613

[22] Filed: Sep. 22, 1994

[51] Int. Cl.$^6$ ......................................................... H04Q 1/02
[52] U.S. Cl. .............................. 340/825.52; 340/825.06; 340/825.07; 439/404; 395/500
[58] Field of Search ........................ 340/825.07, 825.08, 340/825.52, 825.57, 825.06; 395/500; 439/404, 69, 620

[56] References Cited

U.S. PATENT DOCUMENTS

| | | | |
|---|---|---|---|
| 3,824,435 | 7/1974 | Sebille et al. | 340/825.22 |
| 4,016,369 | 4/1977 | Pedersen | 340/825.52 |
| 4,607,170 | 8/1986 | Wickman | 439/620 X |
| 4,626,846 | 12/1986 | Parker et al. | 340/825.52 |
| 4,636,790 | 1/1987 | Diamond | 340/825.52 |
| 4,655,528 | 4/1987 | Groft | 439/404 |
| 5,065,154 | 11/1991 | Kaiser et al. | 340/825.52 |
| 5,218,707 | 6/1993 | Little et al. | 395/500 |
| 5,233,346 | 8/1993 | Minerd et al. | 340/825.07 |
| 5,262,771 | 11/1993 | Herrmann et al. | 340/825.07 |
| 5,434,862 | 7/1995 | Lokhoff | 340/825.07 X |
| 5,483,230 | 1/1996 | Mueller | 340/825.07 X |

FOREIGN PATENT DOCUMENTS

| 4242133 | 6/1994 | Germany | 340/825.06 |
|---|---|---|---|

*Primary Examiner*—Michael Horabik
*Assistant Examiner*—William H. Wilson, Jr.
*Attorney, Agent, or Firm*—John J. McCormack; Mark T. Starr

[57] ABSTRACT

An array of like system modules linked to a common control unit by connect lines, bussed and connected to all the modules by respective removable pin units so that each module address can be generated solely according to which said pin units are not connected.

3 Claims, 5 Drawing Sheets

| PIN | | | |
|---|---|---|---|
| 1 | ADDRESS 0 | 14 | ADDRESS 3 |
| 2 | ADDRESS 1 | 15 | ADDRESS 4 |
| 3 | ADDRESS 2 | 16 | GROUND |
| 4 | GROUND | 17 | GROUND |
| 5 | +12 V | 18 | +12 V |
| 6 | +12 V | 19 | GROUND |
| 7 | GROUND | 20 | GROUND |
| 8 | +12 V | 21 | +12 V |
| 9 | +12 V | 22 | RESET H |
| 10 | RESET L | 23 | INTERRUPT H |
| 11 | INTERRUPT L | 24 | TXD L* |
| 12 | TXD H* | 25 | RXD H* |
| 13 | RXD L* | | |

\* ALSO MC BUS

| PHYSICAL ADDRESSING | | | | | |
|---|---|---|---|---|---|
| PIN # | 1 | 2 | 3 | 4 | 5 |
| PIN VALUE | $2^0$ | $2^1$ | $2^2$ | $2^3$ | $2^4$ |
| ADDRESS | | | | | |
| 0 | 0 | 0 | 0 | 0 | 0 |
| 1 | X | 0 | 0 | 0 | 0 |
| 2 | 0 | X | 0 | 0 | 0 |
| 3 | X | X | 0 | 0 | 0 |
| 4 | 0 | 0 | X | 0 | 0 |
| 5 | X | 0 | X | 0 | 0 |
| 6 | 0 | X | X | 0 | 0 |
| 7 | X | X | X | 0 | 0 |
| 8 | 0 | 0 | 0 | X | 0 |
| 9 | X | 0 | 0 | X | 0 |
| 10 | 0 | X | 0 | X | 0 |
| 11 | X | X | 0 | X | 0 |
| 12 | 0 | 0 | X | X | 0 |
| 13 | X | 0 | X | X | 0 |
| 14 | 0 | X | X | X | 0 |
| 15 | X | X | X | X | 0 |
| 16 | 0 | 0 | 0 | 0 | X |
| 17 | X | 0 | 0 | 0 | X |
| 18 | 0 | X | 0 | 0 | X |
| 19 | X | X | 0 | 0 | X |
| 20 | 0 | 0 | X | 0 | X |
| 21 | X | 0 | X | 0 | X |
| 22 | 0 | X | X | 0 | X |
| 23 | X | X | X | 0 | X |
| 24 | 0 | 0 | 0 | X | X |
| 25 | X | 0 | 0 | X | X |
| 26 | 0 | X | 0 | X | X |
| 27 | X | X | 0 | X | X |
| 28 | 0 | 0 | X | X | X |
| 29 | X | 0 | X | X | X |
| 30 | 0 | X | X | X | X |
| 31 | X | X | X | X | X |

NOTE: X DENOTES REMOVED PIN WITHIN CONNECTOR
0 DENOTES CONNECTION

*Figure 4*

PHYSICAL ADDRESSING OF MODULES

This invention relates to computer arrangements, and especially to such including a control unit linked to a plurality of modules by a cable/pin arrangement.

BACKGROUND FEATURES

Workers are aware of certain difficulties in communicating (e.g addressing) between a computer control unit and a number of related stations, each including its like station-control unit. This invention is directed to a scheme of addressing an array of system modules (e.g. like data storage modules) using pre-existing status lines (e.g. in a status bus), with a simple, convenient modification in each line to thereby designate a unique address for each module.

Conventionally, a master/slave multi-drop communication arrangement requires a means by which the slaves can be distinguished from one another; e.g. by assigning a unique "address" for each individual slave. Typically, this can be done via a DIP switch array on the printed circuit board assembly (for the arrangement). The user, by selectively setting each of the switches to an ON or OFF position, to thereby create a unique "$2^N$ address" (where N is the number of ON-OFF switch positions). If one grounds one side of the switch assembly and provides pull-up resistors on the other side (the microprocessor side), then a "open" or "closed" setting will result in a logic level "1" or "0", respectively.

FIG. 1 indicates this, with a dip switch DS understood as mounted on a Module Control Board assembly MCB, and connected between ground and an array MA of N modules [here, assume DS is a 5-position switch allowing $2^5$, or 32, combinations]. Thus, each module in array MA is individually addressed by physically pre-setting DS.

But, as workers realize, so addressing a module via a "dip switch" can have problems: e.g. the switch can be mis-set; also this approach cannot electronically "store", or re-store, a given module address (as this invention can—see below). Further, it cannot allow a module (once initialized) to "read its own address—as this invention can.

Of course, a Slave Board's Microprocessor MC can "read" this switch DS on initial power-up, and "store" its settings.

The problem with such an arrangement is that the user is responsible for the correct switch setting. This means that he must be aware of all other settings on the bus to ensure that no conflict arises. Should two slaves have the same address setting, then both will attempt to communicate to the master when polled on the serial bus. This will cause data corruption and result in a communication error.

Our approach is different: e.g. as indicated in the FIG. 2 embodiment, we integrate the addressing function into the Communication Bus. Here, address lines aL (assume 5 in this system) are bussed to all the slave boards. The master controller end would ground all the address lines; also each slave microcontroller MC' would have pull-up resistors as in the above mentioned application. (FIG. 1)

Assuming that the communication bus CB is a 25 pin ribbon cable with DB-25 type connectors, one can selectively remove the address pins a–p to each Slave in the connector before assembly. As in the FIG. 1 case there will be 32 possible unique addresses that can thus be designated. By doing this in the cable, we eliminate the possibility of setting any duplicate address; also a user never need to bother to keep track of which addresses have been used. This means that a physical location in a rack will always have a specific, unique address.

Accordingly, it is an object hereof to ameliorate (at least some of) the foregoing difficulties and provide related advantages, as will become more evident upon considering the following disclosure, in conjunction with the accompanying drawings.

DESCRIPTION OF FIGURES

FIG. 2 is a like diagram of a preferred embodiment, while

FIG. 4 tabulates a preferred connection mode for such a cable connector, (cable-connector pin-out for all connectors), according to an embodiment of the invention.

PREFERRED EMBODIMENT

The methods and means discussed herein, will generally be understood as constructed and operating as presently known in the art, except where otherwise specified; with all materials, methods and devices and apparatus herein understood as implemented by known expedients according to present good practice.

COMMUNICATION

Figure 2:
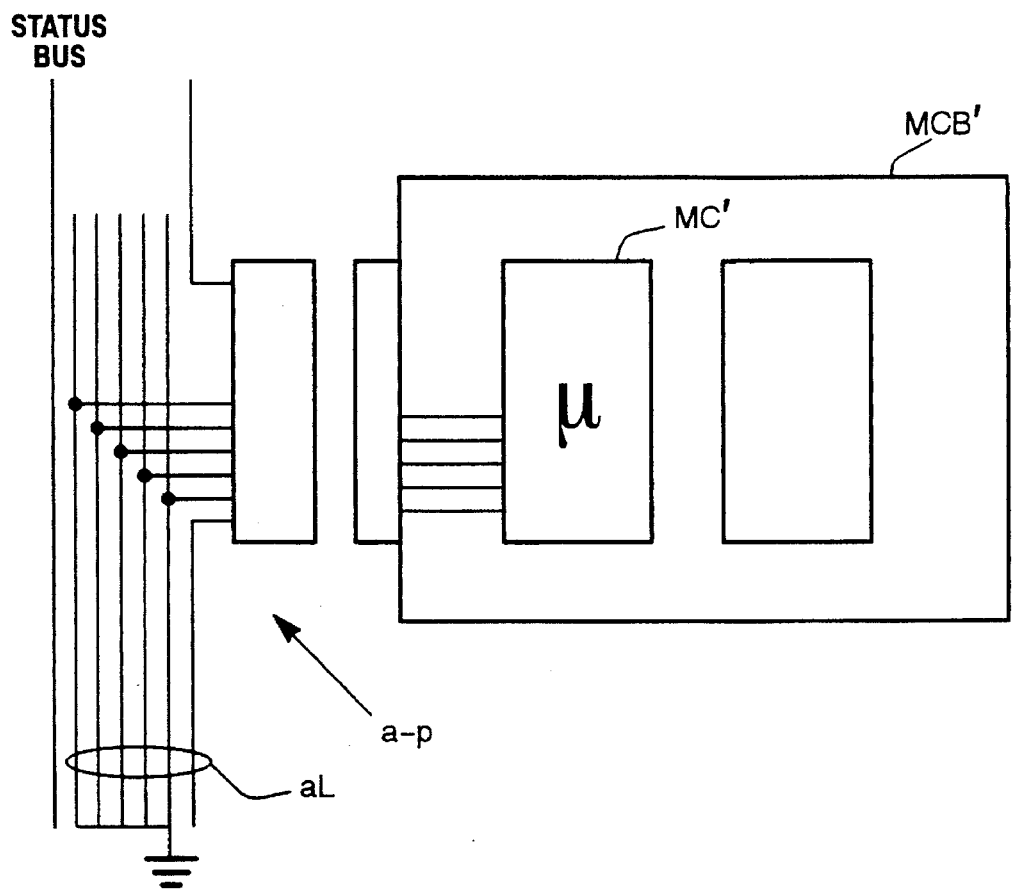

Communication between an Operator Panel OP (FIG. 2A) and related disk drive modules DSM in a system will be understood as taking place via a pair of "Status Buses," i.e. STATUS Bus A, and STATUS Bus B: SB-A, SB-B. Each cabinet will have two Status Bus Interface cables for this, these leading from a Master Controller unit MCT (panel OP included on MCT). Each such cable will be understood as, preferably, a 25 pin harness with "DB25 style" connectors. (e.g. similar to cable aL in FIG. 2, but having twenty five (25) lines, ten to be allocated to the indicated ten modules).

STATUS BUS CABLE

Figure 3:
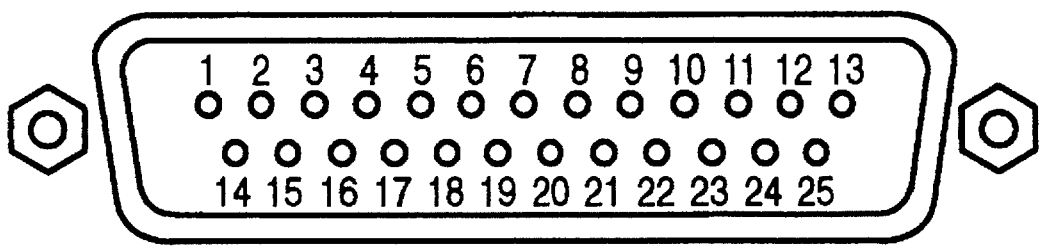
FIG. 3 gives a preferred cable-connector "pin-out" for all cable connectors thereof.

The Status Buses (e.g. SB-A, SB-B) are the main link between the master controller printed circuit board (MCT-CB); housed in operator panel, OP, and the drive modules DSM. Each bus, here, is a 25-conductor, flat ribbon, connector, preferably, with, a 25-pin "DB25 type" connector. Our preferred pin-out for the male SBS board connector and associated functions is given in FIG. 3.

There are three main functions of each Status Bus (cable):

1) "RS485 Differential" Data communications; also Interrupt and Reset functions, between operator panel OP and its drive (data storage) modules DSM;

2) To provide power to its disk drive modules; A +12 volt DC source (originating from Master Controller MCT) is used and is regulated to TTL (+5) level on an individual Slave (module) basis; and 3) To address up to 32 different devices (Slaves) attached to the cable.

Figure 1:
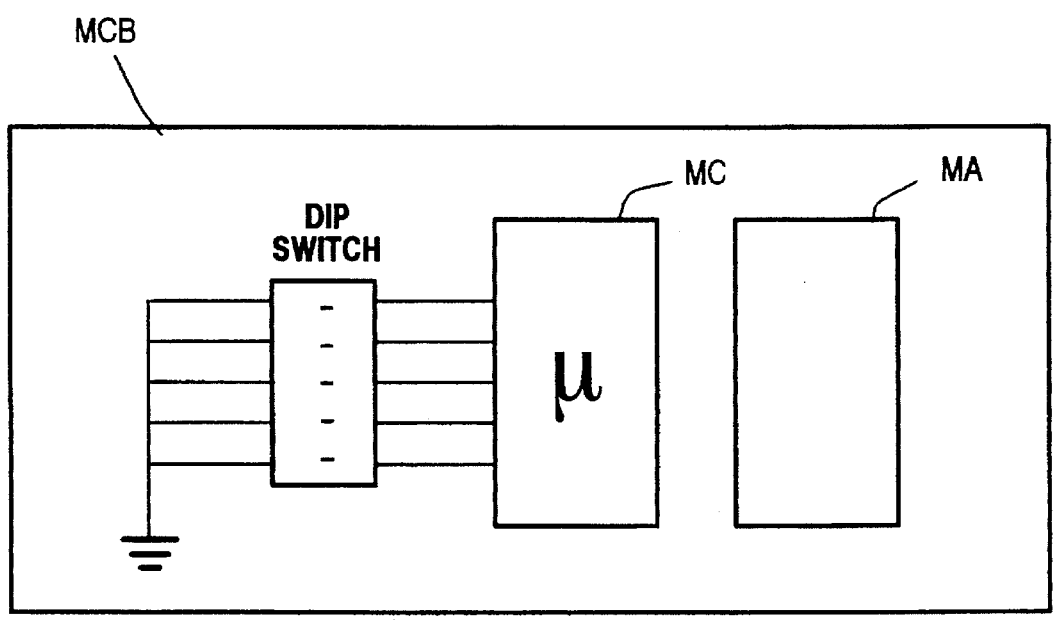
FIG. 1 is a very simplistic schematic block diagram of a more conventional addressing scheme.

A salient unique feature here is that conventionally-required "Address switches" (e.g. dip-switch in FIG. 1) are not required on the Slaves. By selectively removing a different pin for each slave, in a binary sequence, on that slave's cable connector, we can thereby address and program up to 32 devices from a mere five Address lines.

This enables one to plug-in any module in any location without having to reconfigure any associated device address switches. The different address locations are dictated by the physical SB connector, rather than by the type of device attached to it or by any programmed address. This feature avoids occurrence of "cockpit error" in installing the data module, and, in doing so, eliminates a common, and serious, failure mode.

The SB cable is quite "universal": i.e. virtually any external device can be attached to it, so long as the communication firmware is compatible. It provides all the necessary I/O, and thus can be used in any application that calls for communication between a "Master device" (e.g. MCT) and several (up to 32) "Slave devices" (e.g. DSM). These Slave devices can be powered from the SB cable so long as its total power capacity is not exceeded.

The Status Bus harness here preferably provides six power lines and six ground lines to supply (+12 V) power to the Status Bus Slave boards (up to 32).

Figure 2A:
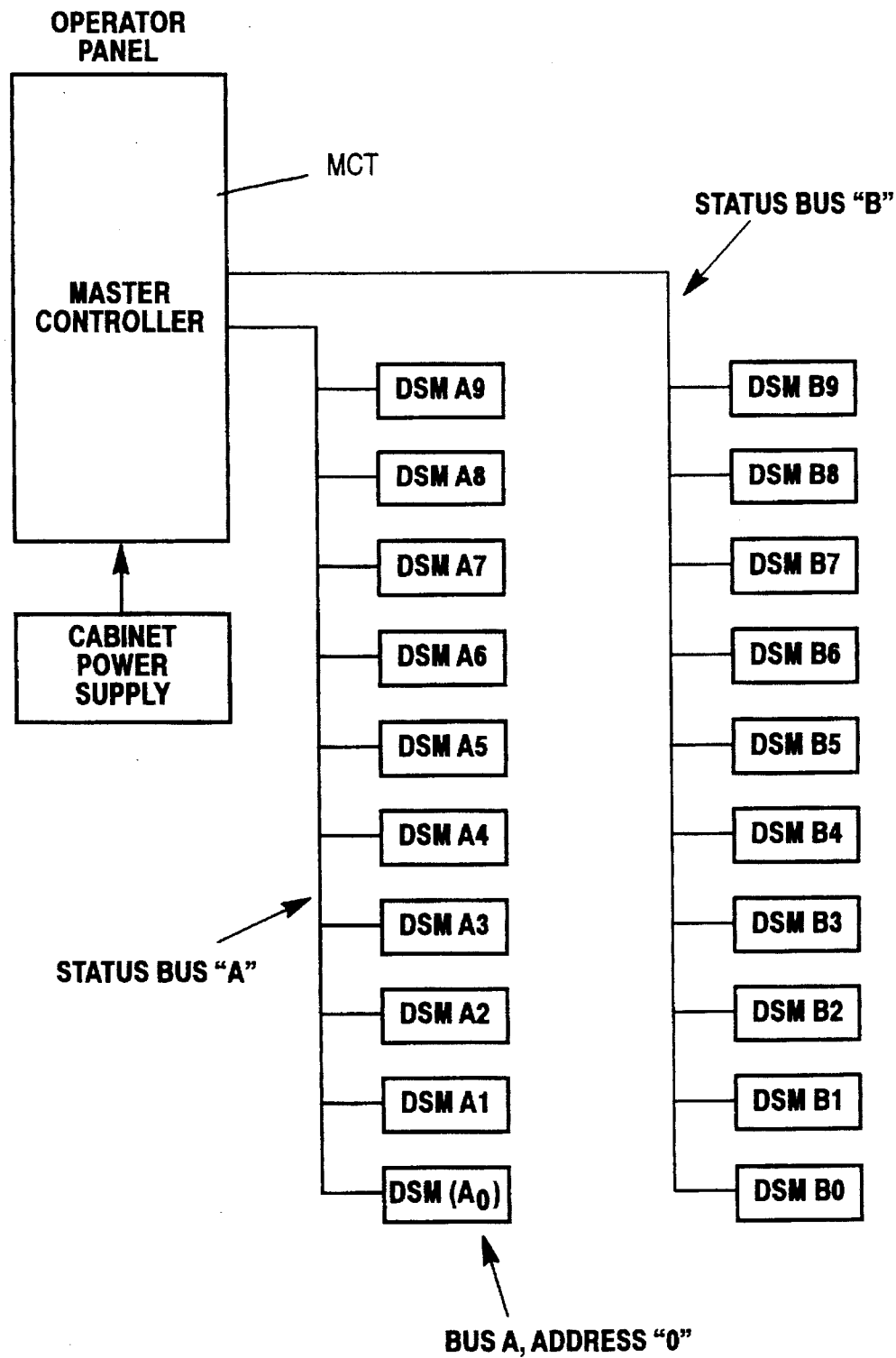
FIG. 2A very schematically indicates the same in a disk drive array modified according to this invention.

In FIG. 2A, ten modules (DSM boards $A_0$ through $A_9$) are shown fed by STATUS BUS A, and ten more ($B_0$–$B_9$) are fed by STATUS BUS B. Each bus can dedicate five address-lines to addressing its ten modules (though up to 32 modules could be accommodated: i.e. $2^5$=32). FIG. 4 further demonstrates how this can be done, with the five lines and with various combinations of pin-removal patterns [X denotes removed pin, thus at "Address zero": no pins, at "Address #1": one pin, (or $2^0$=1), at "Address #3": a $2^0$ pin plus a $2^1$ pin (or 1+2=3), etc., with "Address #31" designated by removal of all pins—note: system logic will distinguish this case from a "disconnect" or "no-power" condition, e.g. detecting absence of +12 V. on other pins in cable]. For example, all such lines may be coupled to "Ground" initially, whereupon removal of any such "pin" acts to couple its line to "HIGH V".

Thus, with some number (N) of some number (X) of common input-lines to X modules, and each line given a different addressing-value, a unique module address is physically-denoted by a pattern of interruption/non-interruption of individual lines according to the "summed value" of the remaining, conductive lines.

Here (FIG. 2A), five lines are dedicated to addressing each set of DSM modules. The Address lines are not active signal lines, since the modules are not "selected" by sending an address on these lines. These lines are grounded at the Operator Panel; and the mere presence or absence of connector pins at a data module will determine the module's physical address. This configuration allows a "module address" to be changed simply by changing its position on the status bus harness.

Six lines (three pairs) are reserved for communication on the status bus. These differential line-pairs are: "Interrupt", "Transmit Data", and "Receive Data".

CONCLUSION

It will be understood that the preferred embodiments described herein are only exemplary, and that the invention is capable of many modifications and variations in construction, arrangement and use without departing from the spirit of the invention.

Modifications of the invention are possible; for example the means and methods disclosed herein are also applicable to other control/module (master/slave) arrangements, as well as to other (related and unrelated) components; and it will be understood that the present invention is also applicable for enhancing other related control arrangements.

Examples given above of other possible variations of this invention are merely illustrative. Accordingly, the present invention is to be considered as including all possible modifications and variations within the scope of the invention as defined by set forth in the appended claims.

What is claimed is:

1. A method of addressing an array of system modules, each linked in parallel to a common control unit by a like set of connect lines, said method comprising:

bussing said connect lines in each set to all said modules in parallel, and connecting each said module thereto by a like set of respective removable pin means, with one pin means for each line so as to allow each module address value to be generated solely according to which said pin means thereof are removed, so that, with pin #0 having a binary address value (BAV)=$2^0$, pin #1 having a BAV=$2^1$; pin #2 having a BAV=$2^2$, and so on, each said module is thus given a unique BAV simply by removing a unique pattern of said pins thereat for a total of $2^N$ possible BAV; so as to, define each module address as a unique one of $2^N$ possible binary address values.

2. A method of addressing an array of system modules linked in parallel to a common control unit by cable means comprising parallel sets of like connect lines, one set to each module, said method comprising:

bussing each said set of said connect lines to all said modules and connecting each said module thereto by respective removable pin means, with one pin means for each said line, so as to allow each module address to be generated solely according to which of its said pin means are removed with pin #1 having a binary address value BAV $2^0$, pin #2 having a BAV=$2^1$; pin #3 having a BAV=$2^2$ and so on, each said module being given a unique BAV simply by removing a unique pattern of said pins for a total of $2^N$ possible BAV.

3. The method of claim 2, wherein said modules comprise like data storage modules;

wherein said lines are so connected via one or more status buses;

wherein said lines couple a master control unit to slave boards mounting said modules, with each slave board provided with a slave microcontroller; and wherein said lines and buses are arranged to not only so address said modules, but also to supply data communication and power functions.

* * * * *